US009667596B2

(12) United States Patent
Halabi (10) Patent No.: US 9,667,596 B2
(45) Date of Patent: May 30, 2017

(54) FIREWALL POLICY COMPARISON

(71) Applicant: Bank of America Corporation, Charlotte, NC (US)

(72) Inventor: Mohamad Halabi, Denver, CO (US)

(73) Assignee: Bank of America Corporation, Charlotte, NC (US)

( * ) Notice: Subject to any disclaimer, the term of this patent is extended or adjusted under 35 U.S.C. 154(b) by 19 days.

(21) Appl. No.: 14/296,230

(22) Filed: Jun. 4, 2014

(65) Prior Publication Data

US 2015/0358291 A1 Dec. 10, 2015

(51) Int. Cl.
*H04L 29/06* (2006.01)
(52) U.S. Cl.
CPC .................. *H04L 63/0263* (2013.01)
(58) Field of Classification Search
CPC .................................................. H04L 63/0263
See application file for complete search history.

(56) References Cited

U.S. PATENT DOCUMENTS

| | | | | |
|---|---|---|---|---|
| 8,286,239 B1 * | 10/2012 | Sutton | ................. | H04L 63/0227 726/22 |
| 8,353,021 B1 * | 1/2013 | Satish | ................. | H04L 63/0263 709/202 |
| 2005/0283823 A1 * | 12/2005 | Okajo | .................. | G06F 21/604 726/1 |
| 2006/0021021 A1 | 1/2006 | Patel | | |
| 2007/0266431 A1 | 11/2007 | Matsuda | | |
| 2008/0034073 A1 * | 2/2008 | McCloy | ............. | H04L 63/0236 709/223 |
| 2008/0215518 A1 | 9/2008 | Matsuda | | |
| 2008/0282335 A1 | 11/2008 | Abzarian et al. | | |
| 2012/0240186 A1 | 9/2012 | Yoo | | |

OTHER PUBLICATIONS

Jan. 21, 2016—(US) Non Final Office Action—U.S. Appl. No. 14/295,912.
May 12, 2016—(US) Notice of Allowance—U.S. Appl. No. 14/295,912.
Dec. 18, 2015—(US) Office Action—U.S. Appl. No. 14/295,767.

* cited by examiner

*Primary Examiner* — Saleh Najjar
*Assistant Examiner* — Simon Kanaan
(74) *Attorney, Agent, or Firm* — Banner & Witcoff, Ltd.; Michael A. Springs (57) ABSTRACT

Systems, methods, and apparatuses for comparing firewall policies are described. In one aspect, a system includes a first gateway configured to implement a first firewall having a first policy, a second gateway configured to implement a second firewall having a second policy, and a computing device configured to compare the first policy with the second policy to determine whether the first policy matches the second policy. The first firewall and the second firewall may be implemented with different technologies and/or on different platforms. The computing device may operate as, or execute, a firewall comparison tool to parse raw firewall configuration data from the different firewalls and generate data structures with a common format so that the firewall policies may be compared.

20 Claims, 7 Drawing Sheets

| Policy A Rule # | Policy A Source Field | Policy A Destination Field | Policy A Service Field | Policy B Rule # | Policy B Source Field | Policy B Destination Field | Policy B Service Field | Score | Explanation |
|---|---|---|---|---|---|---|---|---|---|
| 1 | Object1 Object2 Object3 | Object4 Object5 Object6 | Object7 | 1 | Object1 Object2 Object3 | Object4 Object5 Object6 | Object7 | 100% Exact Match | |
| 2 | Object1 Object9 Object10 | Object9 | Object10 | 2 | Object1 Object9 Object10 | Object9 | Object10 | 100% Exact Match | |
| 3 | Object11 | Object12 Object14 | Object13 | 4 | Object11 | Object14 | Object13 | 66% Low confidence | Destination fields do not match. Destination field of Policy A includes Object12 which is not in the destination field of Policy B. |
| 4 | Object15 Object16 | Object17 Object18 | Object19 | 5 | Object15 Object16 | Object17 Object18 | Object20 | 80% (4 out of 5 match) | Service fields do not match. |
| 5 | Object21 Object22 Object23 | Object25 | Object26 | | | | | | No matching rule in Policy B. |
| 6 | Object27 | Object28 Object29 | Object30 | 7 | Object27 Object31 | Object28 Object29 | Object30 | 95% | Source fields do not match. Policy B includes Object31. |
| 7 | Object1 | Object4 | Object7 | 6 | Object1 | Object4 | Object7 | 97% | Not all object properties of Object1 in source fields match. |
| | | | | 3 | Object40 Object41 | Object50 | Object60 | | No matching rule in Policy A. |

FIG. 7

FIREWALL POLICY COMPARISON

FIELD OF ART

Aspects of the disclosure generally relate to methods and computer systems, including one or more computers particularly configured and/or executing computer software. More particularly, aspects of this disclosure relate to a tool for comparing firewall policies on the basis of, for example, firewall configuration data.

BACKGROUND

The number of online services continues to grow as Internet access and society's acceptance of online services increase. Online services include a wide range of services that were traditionally offered at brick and mortar establishments and through other channels, and that are now provided through websites (and webpages thereof) accessible via the Internet. Online services may provide banking, investing, shopping, shipping, television, music, etc. One impediment to the growth and/or usage of online services is the desire for security. Both those offering and receiving (or interested in offering and receiving) online services may be concerned with the security of information exchanged when participating in online services.

To address security concerns, firewalls have been established and deployed. A firewall is a system (implemented with hardware and/or software) that controls network traffic to protect against unauthorized access through the network to information and computing devices behind the firewall. Firewalls may control network traffic based on rules set forth in a policy. Different firewalls may have different policies with different rules. In some instances, firewalls may block network traffic according to the rules of the policy. As such, firewalls may protect information and computing devices from access by hackers, viruses, and worms.

Many online service providers use firewalls to protect information and computing devices. In some cases, an online service provider may use multiple firewalls, which may or may not have the same policies. Moreover, firewall policies may change over time (e.g., to address new security threats, such as new viruses), and firewall policies may be added and/or removed (e.g., as online services are added and/or removed). As such, there may be challenges and obstacles to maintaining firewalls.

In light of the above, it should be understood that there may be a demand, for example, among online service providers, their personnel, and others (e.g., contractors) responsible for maintaining the firewalls, for methods, devices, software, and systems that assist in maintaining firewalls.

BRIEF SUMMARY

The following presents a simplified summary of the present disclosure in order to provide a basic understanding of some aspects of the disclosure. The summary is not an extensive overview of the disclosure. It is not intended to identify key or critical elements of the disclosure or to delineate the scope of the disclosure. The following summary merely presents some concepts of the disclosure in a simplified form as a prelude to the detailed description below.

Aspects of the disclosure relate to methods, computer-readable media, systems and apparatuses for comparing firewall policies. For example, aspects include methods, computer programs, systems, and apparatuses for providing a firewall comparison tool that matches one or more rules of one firewall policy with one or more rules of another firewall policy. Aspects of the disclosure allow policies to be compared even where the firewall policies are implemented with different technologies and/or on different platforms. Aspects of the disclosure also provide a web portal for users (e.g., those responsible for and/or wishing to maintain various firewall policies) to select which policies to compare and review results of the comparison.

In some aspects, a system may include a first gateway configured to implement a first firewall having a first policy, a second gateway configured to implement a second firewall having a second policy, and a computing device configured to compare the first policy with the second policy to determine whether the first policy matches the second policy. The first firewall and the second firewall may be implemented with different technologies and/or on different platforms. The computing device may operate as, or execute, a firewall comparison tool to parse raw firewall configuration data from the different firewalls and generate data structures with a common format so that the firewall policies may be compared.

Further, in some aspects, a non-transitory computer-readable storage medium may store computer-executable instructions that, when executed by a computing device, may cause the computing device to receive first configuration data of a first firewall having a first policy, receive second configuration data of a second firewall having a second policy, and compare the first policy with the second policy based on the first configuration data and the second configuration data to determine whether the first policy matches the second policy. The computer-executable instructions, when executed, may further cause the computing device to output a score indicating a degree to which a first rule of the first policy matches a second rule of the second policy. The score may be determined based on a number of object properties of the first rule that match object properties of the second rule.

Additionally, in some aspects, a method may include receiving first configuration data of a first firewall having a first policy, receiving second configuration data of a second firewall having a second policy, and comparing the first policy with the second policy based on the first configuration data and the second configuration data to determine whether the first policy matches the second policy. The method may further include parsing the first configuration data and the second configuration data, generating a first data structure, comprising the first configuration data, generating a second data structure, comprising the second configuration data, the first data structure and the second data structure having a common format, determining a score indicating a degree to which a first rule of the first policy matches a second rule of the second policy, and outputting, via a web portal, the score and an explanation identifying objects of the first rule that do not match objects of the second rule, wherein the first firewall is implemented on a different platform from that of the second firewall. Any of the steps of this method may be performed by any of the computing devices disclosed herein.

Of course, the methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which the disclosure may be practiced. It is to be understood that other embodiments may be utilized, and that structural and functional modifications may be made, without departing from the scope of the present disclosure. Additionally, U.S. patent application Ser. No. 14/295,767 filed on Jun. 4, 2014, entitled "Firewall Policy Browser", and U.S. patent application Ser. No. 14/295,912 filed on Jun. 4, 2014, entitled "Firewall Policy Converter", are hereby incorporated by reference herein in their entirety.

It is noted that various connections between elements are discussed in the following description. It is noted that these connections are general and, unless specified otherwise, may be direct or indirect, wired or wireless, and that the specification is not intended to be limiting in this respect.

As will be discussed further below, aspects described herein relate to a tool (also referred to herein as the "firewall comparison tool") for comparing firewall policies. The tool may refer to the hardware (e.g., computer processor(s)) and/or software (e.g., a computer application or program) that allows a user to choose two or more different policies for comparison. The firewall comparison tool and any other aspects disclosed herein may be part of, be packaged with, supplement, be supplemented by, or otherwise be combined or modified with aspects (e.g., a firewall policy browser and/or a firewall policy converter) disclosed in U.S. patent application Ser. No. 14/295,767 filed on Jun. 4, 2014, entitled "Firewall Policy Browser", and U.S. patent application Ser. No. 14/295,912 filed on Jun. 4, 2014, entitled "Firewall Policy Converter", which are incorporated by reference herein in their entirety.

The firewall comparison tool may be technology and/or platform agnostic, so that firewall policies implementing any technology or platform available now and in the past and similar technologies and platforms available in the future may be compared. The firewall comparison tool may collect raw firewall configuration data (e.g., policy name information, policy definition information, target gateway information, source information, destination information, service information, etc.) from one or more gateways. The gateways may belong to the same or different networks (e.g., gateways for different data centers). The raw firewall configuration data may be collected automatically according to a schedule (e.g., collected daily, weekly, monthly, or at any other periodic or intermittent basis) or in response to a user input (e.g., a user request to collect raw firewall configuration data).

In some embodiments, the firewall comparison tool may parse the raw firewall configuration data. Different firewalls may provide the raw firewall configuration data in different forms. The firewall comparison tool may generate one or more data structures, including the raw firewall configuration data from one or more firewalls, respectively. These data structures may have a common or unified format despite that the raw firewall configuration data for different firewalls may be received/collected in different formats.

A user of the firewall comparison tool may choose two or more firewall policies for comparison. In some embodiments, the firewall comparison tool may be implemented as a web application executed by a web portal. Accordingly, a user may navigate his/her web browser to the web portal and select the two firewall policies to compare. In some embodiments, the firewall comparison tool may automatically select policies for comparison. For example, the firewall comparison tool may select policies to compare according to various schemes and algorithms.

After policies are selected for comparison, the firewall comparison tool may compare the policies rule by rule. For example, the firewall comparison tool may select a rule in a first policy and compare that selected rule to each rule in a second policy to identify a match. Comparing rules may be performed by, for example, comparing similar fields (and object properties thereof) for each policy. For example, the firewall comparison tool may compare a source field (e.g., object properties thereof) of a first rule in the first policy against a source field (e.g., object properties thereof) of a first rule in the second policy. Comparing rules may also include comparing multiple fields (and object properties thereof) of one rule to multiple corresponding fields (and object properties thereof) of another rule. For example, in addition to comparing the source fields, the firewall comparison tool may compare a destination field of the first rule in the first policy against a destination field of the first rule in the second policy.

If no match is found, the firewall comparison tool may determine that there is no match for the selected rule and flag the selected rule accordingly. Whether there is a match or not, the firewall comparison tool may move on to another rule (e.g., a next rule) in the first policy and compare that rule to each rule in the second policy to identify whether there is a match. The process of comparing rules may be repeated for each rule in the first policy and/or second policy. Eventually, the firewall comparison tool may evaluate results of the comparison and output the results for a user to review. In some instances, the firewall comparison tool may evaluate the results and determine one or more scores. The firewall comparison tool may determine a score for the comparison of two policies as a whole and/or scores for each matching pair of rules. For example, if all rules of the first policy match all rules of the second policy, the firewall comparison tool may determine the score of the comparison between the first and second policies to be a 100 (or 100%) representing a complete or exact match. In contrast, for example, if only 75% of the fields of one policy match fields of another policy, the tool may determine and output a score of 75 (or 75%). Although scores are described here as being on a scale of 0 to 100 (or 0% to 100%), the scores may be scaled to provide other ranges of outputs. In some cases, the scores may be translated into different formats (e.g., textual results, color-coded results, etc.). For example, the results of the comparison may be output as text reciting "exact match," "high confidence," "medium confidence," or "low confidence." The results may also indicate which rules and/or fields produced matches and/or which ones did not match.

These and additional examples and arrangements will be discussed more fully below.

Figure 1:
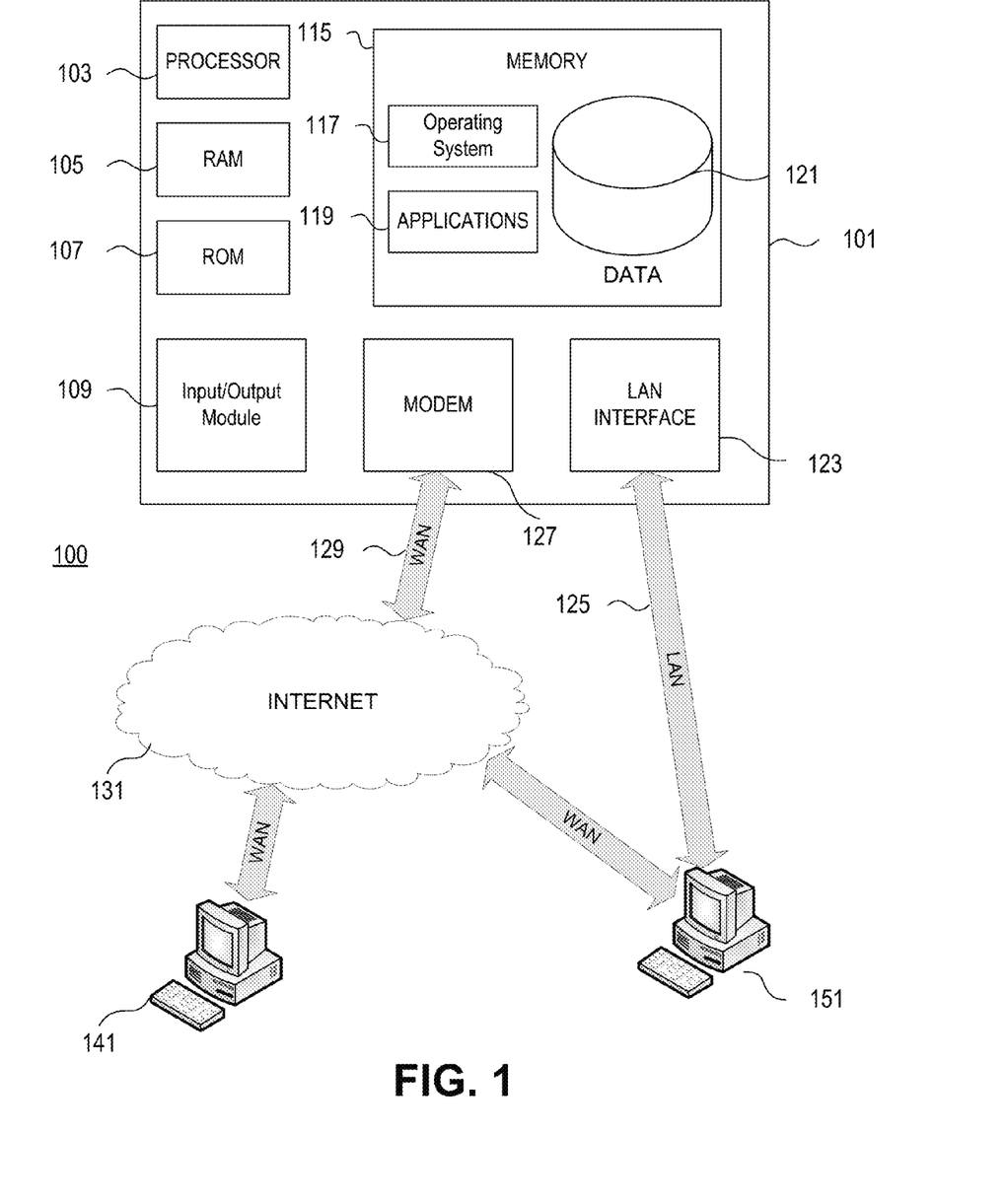
FIG. 1 is an illustrative block diagram of an example computing device that may be used according to an illustrative embodiment of the present disclosure.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include a computing device 101. In one or more embodiments, teachings of the present disclosure may be implemented with a computing device 101. The computing device 101 may have a processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information, such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor 103 to perform steps of a method in accordance with aspects of the disclosed arrangements is contemplated. For example, aspects of the method steps disclosed herein may be executed on a processor 103 of computing device 101. Such a processor 103 may execute computer-executable instructions stored on a computer-readable medium.

Software may be stored within memory 115 and/or storage to provide instructions to processor 103 for enabling computing device 101 to perform various functions. For example, memory 115 may store software used by the computing device 101, such as an operating system 117 and application programs 119, and may include an associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a display device for providing textual, audiovisual and/or graphical output.

Computing device 101 may operate in a networked environment supporting connections to one or more remote computing devices, such as computing devices 141 and 151. Computing devices 141 and 151 may be personal computing devices or servers that include any or all of the elements described above relative to computing device 101. In some embodiments, computing devices 141 or 151 may be a mobile device (e.g., smart phone) communicating over a wireless carrier channel. Also, in some embodiments, the computing device 101 may be connected to the computing devices 141 or 151 to form a "cloud" computing environment.

The computing device 101 may include a local area network (LAN) interface 123 for communicating via a LAN connection 125 (which may be a wireless LAN (WLAN) connection, such as a Wi-Fi connection). The computing device 101 may also include a wide area network (WAN) interface 127, such as a modem, for communicating via a WAN connection 129, as well as other interfaces for communicating over other networks. In some embodiments, the WAN connection 129 may be used to communicate with other computing devices via a WAN 131, such as the Internet. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations, including distributed computing environments. Further, the computing device 101 may be similar to any of a variety of specially configured computing devices, such as a personal computer (e.g., a desktop computer), server, laptop computer, notebook, tablet, smartphone, consumer electronics, minicomputers, mainframe computers, etc. Also, the computing device 101 may have a firewall comparison tool for performing methods and/or executing computer-executable instructions to compare firewall policies. The firewall comparison tool may be implemented with one or more processors (which may be specially configured or may be a general processor 103) and one or more storage units (e.g., databases, RAM, ROM, and other computer-readable media), one or more application specific integrated circuits (ASICs), and/or other hardware components. In cases where one or more processors are used to implement the firewall comparison tool, the one or more processors may be specially configured processors in addition to or in place of one or more general processor 103 or may be general processors 103 configured to execute a particular application or program.

The computing device 101 of FIG. 1 illustrates an example configuration. In some embodiments, the computing device 101 may include fewer or more elements. For example, the computing device 101 may be a mobile device (e.g., a smartphone, tablet, etc.), and thus, may also include various other components, such as a battery, speaker, and/or antennas (not shown). Also, the computing device 101 may be gateway on which a firewall is implemented.

Figure 2:
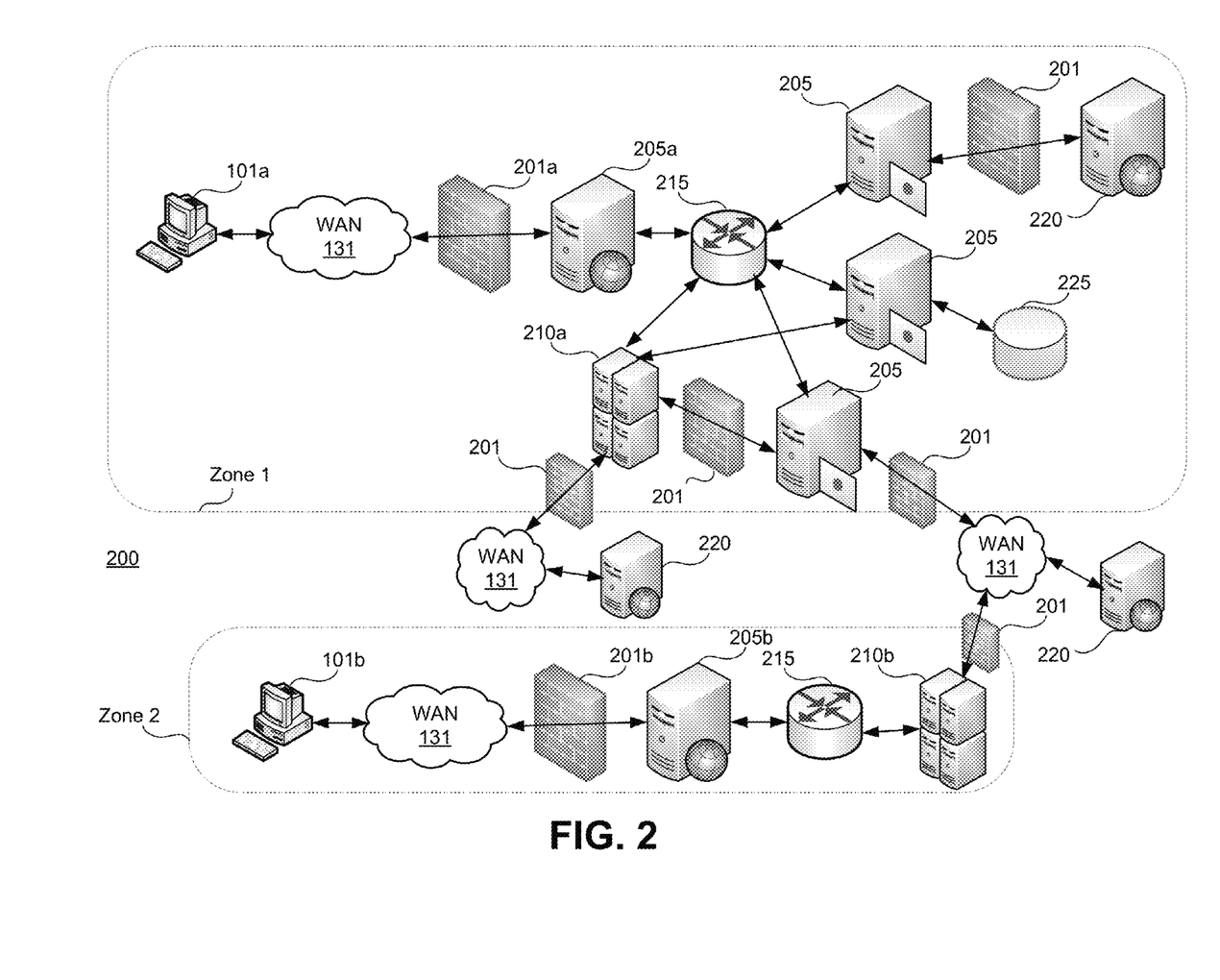
FIG. 2 is diagram illustrating an example environment in accordance with aspects of the present disclosure.

The methods, software, computing devices, and systems for comparing firewall policies may be used in various environments. FIG. 2 illustrates an example environment 200 with firewalls 201 that may be compared in accordance with aspects of the present disclosure. As shown in FIG. 2, the environment 200 may include a first computing device 101a in a first zone (Zone 1) and a second computing device 101b in a second zone (Zone 2). The zones (Zones 1 and 2) may correspond to geographical areas, such as areas having certain zip codes and/or area codes. When the first computing device 101a in Zone 1 attempts to communicate with a particular backend system via WAN 131 (e.g., the Internet), the communication(s) from the first computing device 101a may be transmitted to the first gateway 205a, which may also be in Zone 1. As shown in FIG. 2, communications from the first computing device 101a to the first gateway 205a may controlled by a first firewall 201a. The first firewall 201a may determine whether to block or pass communications from the first computing device 101a to the first gateway 205a. The first firewall 201a may also determine whether to block or pass communications from the first gateway 205a to the first computing device 101a.

As shown in FIG. 2, in some cases, communications from the first computing device 101a may be routed to a first data center 210a in Zone 1 through a router 215 or other network components. The first data center 210a may provide one or more online services (e.g., an online banking service), and therefore, may provide a web portal. The first data center 210a may communicate with one or more other computing devices (e.g., servers 205) in order to provide online services. In some instances, the first data center 210a may communicate with other servers through a firewall 201. Also, in some cases, communications from the first computing device 101a may be routed to various other servers 205 without going through the first data center 210a. Although only one router 215 is shown in the backend system of Zone 1, it should be understood that a number of network components, including multiple routers 215 may be used to route communications. Further, it should be understood that each of the elements in FIG. 2 (e.g., the servers 205, data centers 210, routers 215, etc.) may be configured in a similar manner as the computing device 101 of FIG. 1.

FIG. 2 also illustrates that the first data center 210a may communicate with third party servers 220 (e.g., servers of vendors). Such communications between the first data center 210a and a third party server 220 may be transferred via a WAN 131 (e.g., the Internet) and may also be controlled by a firewall 201. This firewall 201 may determine whether to block or pass communications exchanged between the first data center 210a and a third party server 220. In some embodiments, the first data center 210a may communicate with another computing device (e.g., server 205) which in turn may communicate with a third party server 220.

Although firewalls 201 are shown as separate elements in FIG. 2, it should be understood that the firewalls 201 may be implemented within the computing devices (e.g., servers 205, third party servers 220, and/or data centers 210) to control communications therewith. Further, the different firewalls may have similar or different technologies or platforms. Moreover, the different firewalls may have similar or different policies. For example, the first firewall 201a may have a different policy from the policy of a firewall 201 used to control network traffic between a server 205 or data center 210 and a third party server 220. Still, in some embodiments, each firewall may have a different policy or all firewalls may have the same policy.

Further, the number of firewalls may vary in various embodiments. In some embodiments, a single firewall 201 may be used in the backend system. In other embodiments, multiple firewalls 201 may be used in the backend system. In some embodiments, the backend system may employ multiple firewalls 201 in order to provide a single online service. Also, multiple firewalls 201 may be implemented on a single computing device. For example, the first data center 210a may employ multiple firewalls for communicating with different computing devices (e.g., different servers 205 or different third party servers 220). In another example, the first data center 210a may use multiple firewalls for a single computing device. In other words, certain communications between the first data center 210a and a particular server 205 may be required to pass through two or more firewalls 201.

A common online service (e.g., online banking) may be provided by different backend systems. For example, as illustrated in FIG. 2, different data centers 210 may be accessed depending on an area or zone from which a user (e.g., customer of an online service) is attempting to access an online service. As described above, the first computing device 101a in Zone 1 may be directed to the first gateway 205a of the backend system including the first data center 210a when the first computing device 101a attempts to access a particular online service (e.g., online banking service). In comparison, the second computing device 101b in Zone 2 may be directed, through a second firewall 201b, to a second gateway 205b of another backend system including a second data center 210b when the second computing device 101b attempts to access the same online service (e.g., online banking service) that the first computing device 101 attempts to access. The backend systems including the first data center 210a and the second data center 210b may be owned, controlled, and/or operated by the same entity (e.g., a company, organization, school, financial institution, etc.) or affiliated entities.

Although the backend system for Zone 2 is shown as being different from the backend system of Zone 1 in FIG. 2, the backend systems may be the same or similar in some embodiments. Further, the backend systems of FIG. 2 illustrate some of the components and connections that may be used to provide online services (e.g., online banking, online shopping, online investing, etc.), however, more or fewer components and connections may be used. For example, the backend systems may include one or more databases 225 for storing a variety of information used to provide online services. For example, a database 225 may store usernames and/or passwords used to authenticate users accessing the online service. In particular, such a database 225 may be used by firewalls 201 to authenticate users. For an online banking service, another database 225 may store bank account information for various bank customers, such as bank account numbers, bank account balances, names on a bank account, etc.

Figure 3:
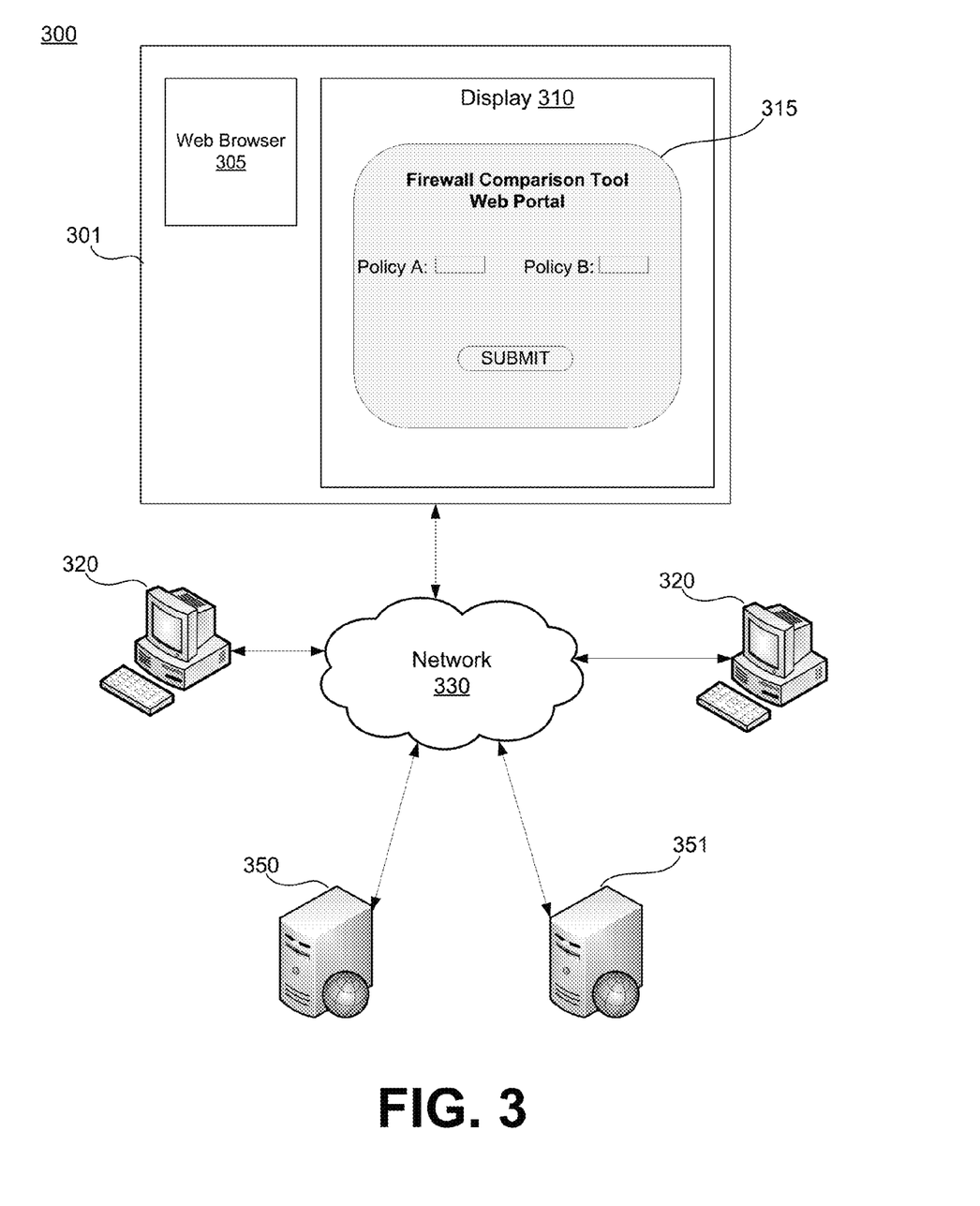
FIG. 3 is diagram illustrating an example environment in accordance with aspects of the present disclosure.

FIG. 3 illustrates an example environment 300 in which the firewall comparison tool may be used. As shown in FIG. 3, the environment 300 may include a computing device 301 configured to execute or operate the firewall comparison tool. The computing device 301 may be configured in a similar manner as the computing device 101 of FIG. 1.

The firewall comparison tool disclosed herein may be useful to more than one system administrator or other personnel (e.g., online service provider employees, contractors, etc.) responsible for maintaining firewalls and/or system security in general. As such, the firewall comparison tool may be implemented in a manner in which it may be operated by a number of users. The computing device 301 may include a web browser 305 for accessing a web portal providing the firewall comparison tool. The computing device 301 may be configured to execute any web browser 305.

Referring to FIG. 3, the computing device 301 may include a display 310 for displaying a web page 315 of the firewall comparison tool. When executed, the firewall comparison tool may generate the web page 315 and cause the web page to be displayed on the display 310. Although FIG. 3 illustrates that only one computing device 301 accessing the firewall comparison tool, other computing devices 320 may also be used to access the firewall comparison tool. In some instances, multiple computing devices 301, 320 may access the firewall comparison tool simultaneously and may perform the same or different firewall policy comparisons simultaneously.

In some embodiments, the firewall comparison tool may be located at one or more backend system servers 350, 351 remote from the computing devices 301, 320. Any of the computing devices 301, 320 may access the backend system servers 350, 351 through a network 330, which may include any network, such as the Internet or a private network (e.g., a virtual private network). The one or more backend system servers 350, 351 may each include a web portal for providing the web page 315 through which firewall policies may be compared. In some embodiments, one backend system server 350 may be included within the backend system of Zone 1 of FIG. 2 and another backend system 351 may be included within the backend system of Zone 2 of FIG. 2. In other embodiments, the backend system servers 350 may be in similar locations or at the same location.

Further, in some embodiments, a username and/or password may be required before a user of the computing device 301 may view the web page 315 through the web portal. In other words, security measures may be taken to restrict or limit access to the firewall comparison tool to certain individuals or computing devices 301, 320 (e.g., computing devices of personnel responsible for maintaining firewall policies).

The backend system servers 350, 351 may be configured to collect raw firewall configuration data from various gateways 205, data centers 210, and other computing devices implementing firewalls 201. For example, the backend system server 350 may be configured to collect raw firewall configuration data of one or more (or all) firewalls 201 in Zone 1 of FIG. 2. Similarly, the backend system server 351 may be configured to collect raw firewall configuration data of one or more (or all) firewalls 201 in Zone 2 of FIG. 2. The backend system servers 350, 351 may also be configured to communicate with one another to exchange the raw firewall configuration data each has collected. Alternatively, one or both of the backend system server 350, 351 may collect raw firewall configuration data from one or more (or all) firewalls 201 across different zones.

The backend system servers 350, 351 may be configured with authentication information that provides the backend system servers 350, 351 with rights to access the firewalls 201 and receive the raw firewall configuration data. The backend system servers 350, 351 may be configured to collect the raw firewall configuration data according to a schedule stored in memory of the backend system servers 350, 351 or memory coupled thereto. Alternatively, the backend system servers 350, 351 may be configured to request the raw firewall configuration data in response to access to a web portal by a user or in response to a request, received through the web portal from the user, to collect raw firewall configuration data or compare firewall policies. Further, in some embodiments, the firewalls 201 or their host computing devices (e.g., gateways 205) may be configured to push the raw firewall configuration data to one or more backend system servers 350, 351.

Further, the backend system servers 350, 351 may facilitate a "cloud" computing environment in which multiple users may view, interact, and/or edit the results of comparing firewall policies. For example, the backend system server 350 may allow a user of computing device 301 and another user of computing device 320 to simultaneously view the web page 315. Accordingly, multiple users may be able to discuss and evaluate the same results of comparing firewall policies. In particular, this feature may be helpful where one user is more familiar with a first firewall policy subjected to a comparison and another user is more familiar with a second firewall policy subjected to the comparison.

Still referring to FIG. 3, the backend system servers 350, 351 may store logs of past firewall policy comparisons as well as statistical information related to the comparisons. For example, the backend system servers 350, 351 may store information indicating dates and/or times when comparisons were made as well as the firewall policies that subject to those comparisons so that users may access a history of past comparisons. The backend system servers may also store the results of past comparisons and keep track of statistics, such as how often policies match or the average scores of comparisons. The backend system servers 350, 351 may include memory for storing any of the above mentioned information or may have access to databases configured to store any of the above mentioned information.

Figure 4:
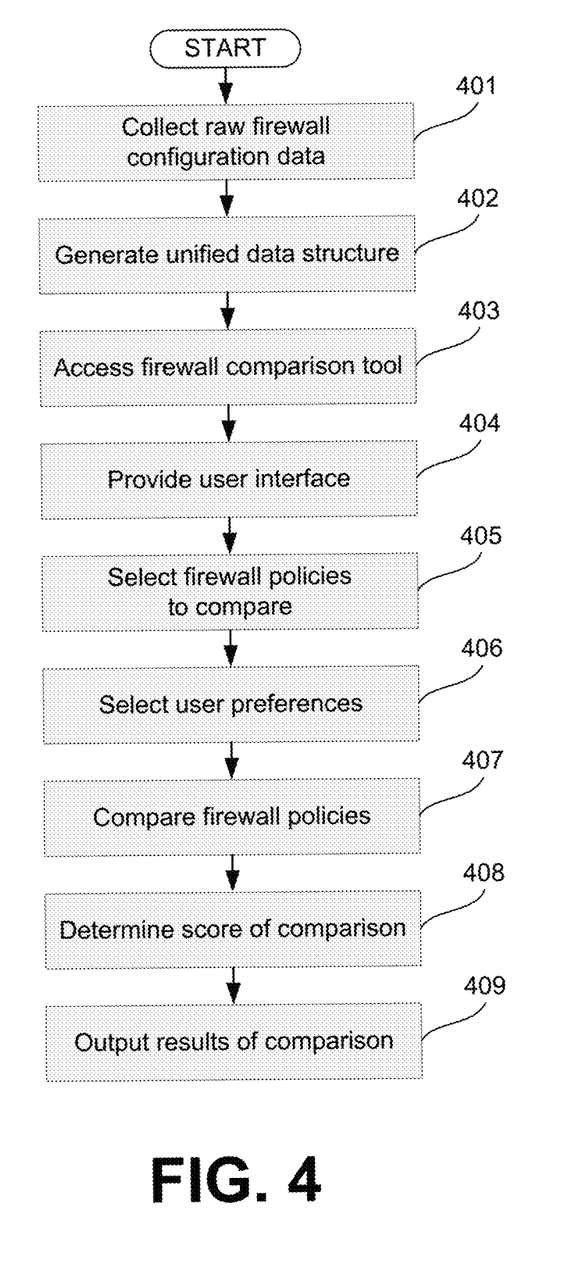
FIG. 4 is a flow diagram illustrating an example method according to one or more aspects described herein.

FIG. 4 illustrates a flow diagram for an example comparison process in accordance with aspects of the present disclosure. More specifically, FIG. 4 illustrates a plurality of steps of a method for comparing firewall policies. The steps of FIG. 4 may be performed by any of the various devices disclosed herein, such as a computing device 301 accessing the firewall comparison tool, a backend system server 350 providing the firewall comparison tool via, e.g., a web portal, data centers 210, gateways 205, and/or the firewalls 201. One or more of the steps of FIG. 4 may be performed by executing the firewall comparison tool and/or using a particularly configured computing device operating as the firewall comparison tool. As a result of the method of FIG. 4, firewall policies may be compared and results of the comparison may be output for review to those interested in such results, such as personnel responsible for maintaining firewalls 201.

The method of FIG. 4 may begin with a step 401 of collecting raw firewall configuration data. The raw firewall configuration data may be collected from each of the firewalls 201 in a system. Different firewalls 201 may use different technologies or platforms, and therefore, the format of the raw firewall configuration data may vary. Some technologies and/or platforms may be specific to particular vendors.

Step 401 may be performed according to a schedule. For example, the schedule may trigger a backend system server 350 to collect the raw firewall configuration data from a set of (or all) firewalls 201 in a system. The schedule may cause the collection of raw firewall configuration data to be performed at any date and time. For example, the collection at step 401 may be performed daily at midnight. Step 401 may also be triggered by authorized personnel at any time.

In step 402, the firewall comparison tool may translate (or convert) the raw firewall configuration data received from one or more firewalls 201 (or each firewall 201 from which raw firewall configuration data is received) into a unified or common data structure. The firewall comparison tool may parse the raw firewall configuration data from different platforms according to rules of the appropriate platform, and store the parsed data in a unified data structure.

In step 403, access to the firewall comparison tool may be provided. In some embodiments, a user may navigate a web browser 305 to access a web portal providing the firewall comparison tool. In some embodiments, the firewall comparison tool may be implemented as a program that is distributed to each person who may wish and/or have authority to access the firewall comparison tool, and accessing the firewall comparison tool may be performed by selecting the program for execution on a computing device 301. Further, accessing the firewall comparison tool at step 403 may include providing and authenticating a username and/or password to log-in to the firewall comparison tool. In a case where the firewall comparison tool is provided through a web portal, the web portal may prompt a user to enter a username and/or password before giving the user access (or complete access) to the firewall comparison tool.

In step 404, the firewall comparison tool may provide a user interface. In a case where the firewall comparison tool is provided through a web portal, the user interface may be a web page. In some embodiments, the user interface may include selectable objects that may be selected by users. Providing the user interface at step 404 may include determining the available selections. For example, if the user interface includes a drop down menu for selecting a firewall policy to compare, step 404 may include determining the list of available firewall policies. Different users may be authorized to compare different firewall policies, and thus, the list of available firewall policies may be based on the user logged-in to, or otherwise authenticated with, the firewall comparison tool.

Figure 5:
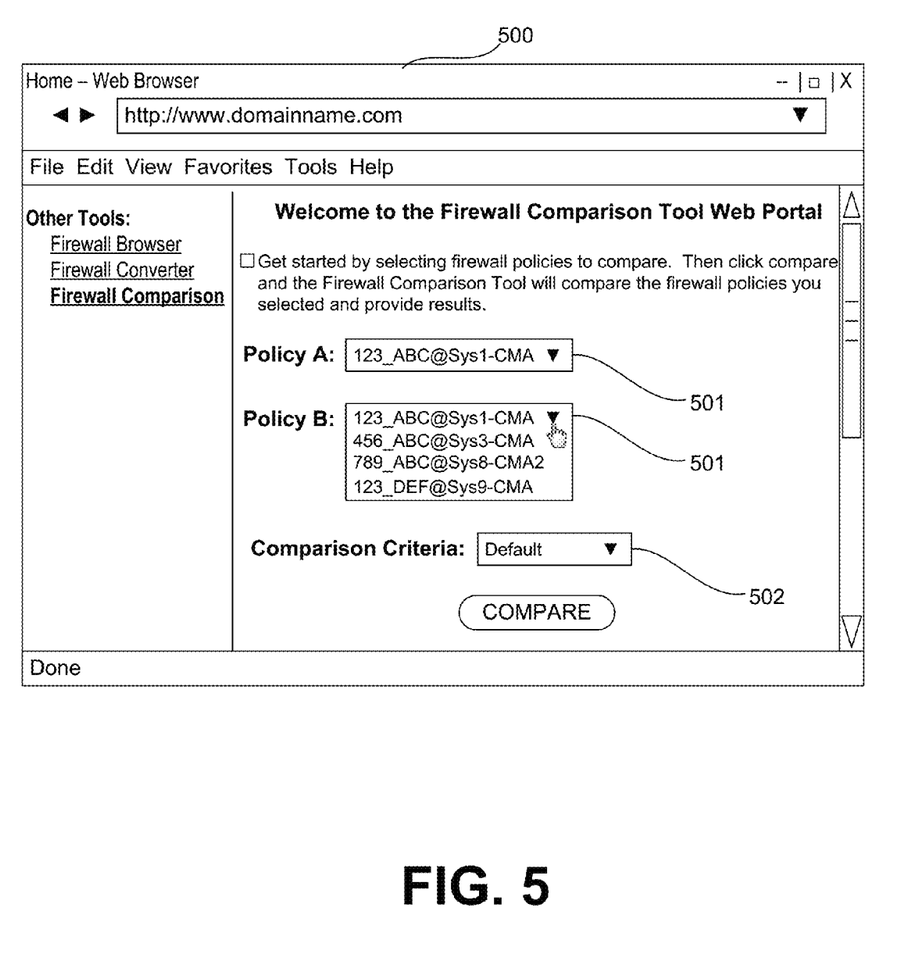
FIG. 5 illustrates an example user interface according to one or more aspects described herein.

FIG. 5 illustrates an example user interface 500 that may be provided at step 404. As shown in FIG. 5, the user interface 500 may include selectable objects 501 that may be manipulated in response to user inputs. For example, the selectable objects 501 may include drop down menus, text box fields, check boxes, radio buttons, etc. The selectable objects 501 may provide a way for users to input various information described herein.

In step 405, a user may choose which firewall policies he/she wishes to compare. Two or more firewall policies may be chosen at step 405. For example, referring to FIG. 5, a user may choose a first firewall policy (Policy A) using one drop down menu 501 and a second firewall policy (Policy B) using another drop down menu 501. Various other methods may be used to select the firewall policies. In some embodiments, the firewall comparison tool may offer a search tool that searches for firewall policies to compare based on user entered search criteria. For example, the user interface 500 provided by the firewall comparison tool may include objects for capturing search criteria used to locate firewall policies desired for comparison.

In some embodiments, to facilitate the selection at step 405, the user may be provided with a list of firewall policies from which the user may choose. The list may include all firewall policies in a system or any subset thereof. For example, the list may include only those firewall policies that a user is permitted to compare. The firewall policies may be listed by name and/or by other identifying information (e.g., a policy ID, a policy definition, target gateway of a policy, etc.). In the illustrated example of FIG. 5, example names of firewall policies available for comparison are shown in the drop down menus 501.

In step 406, a user may specify comparison criteria. Various comparison criteria may be specified at step 406. For example, a user may select fields (e.g., a source field, destination field, and/or service field) on which the comparison may be based. The firewall comparison tool may capture the comparison criteria entered by users. Various methods and objects may be used to set the comparison criteria. For example, the user interface 500 may include another drop down menu 502 that allows a user to select comparison criteria, such as which of the fields to compare. In some embodiments, the firewall comparison tool may use a default setting for the comparison criteria. The default setting may indicate that the firewall policies are to be compared based on the source field, destination field, and service field.

Additionally, other user preferences may be set at step 406. For example, a user may set whether the comparison should be further based on object names, object types, and/or object properties (e.g., IP addresses, port ranges, etc.). The firewall comparison tool may capture such settings at step 406. Further, the firewall comparison tool may also allow a user to define how results of the comparison are to be structured at step 406. For example, the firewall comparison tool may allow a user to determine the layout (e.g., dimensions and organization), coloring, etc. of the output (e.g., a table) of the firewall policy comparison. Moreover, the firewall comparison tool may allow a user to dictate how results are to be delivered at step 406. For example, a user may choose whether results are to be displayed, printed, emailed, and/or transmitted and related destination information (e.g., printer name, email address, cell phone, etc.).

In step 407, the selected firewall policies may be compared against each other. For example, the firewall comparison tool may compare the firewall policies selected in step 405. Various algorithms may be used to compare the firewall policies. Different algorithms may be used in different cases depending on the policies selected and/or other preferences designated. For example, some algorithms may compare a greater number of fields than others to provide a more accurate comparison. On the other hand, a relatively low number of fields may be compared to provide a quick comparison. Further, the algorithms may be prepared using a variety of programming languages (e.g., Java, C++, R, etc.).

Figure 6:
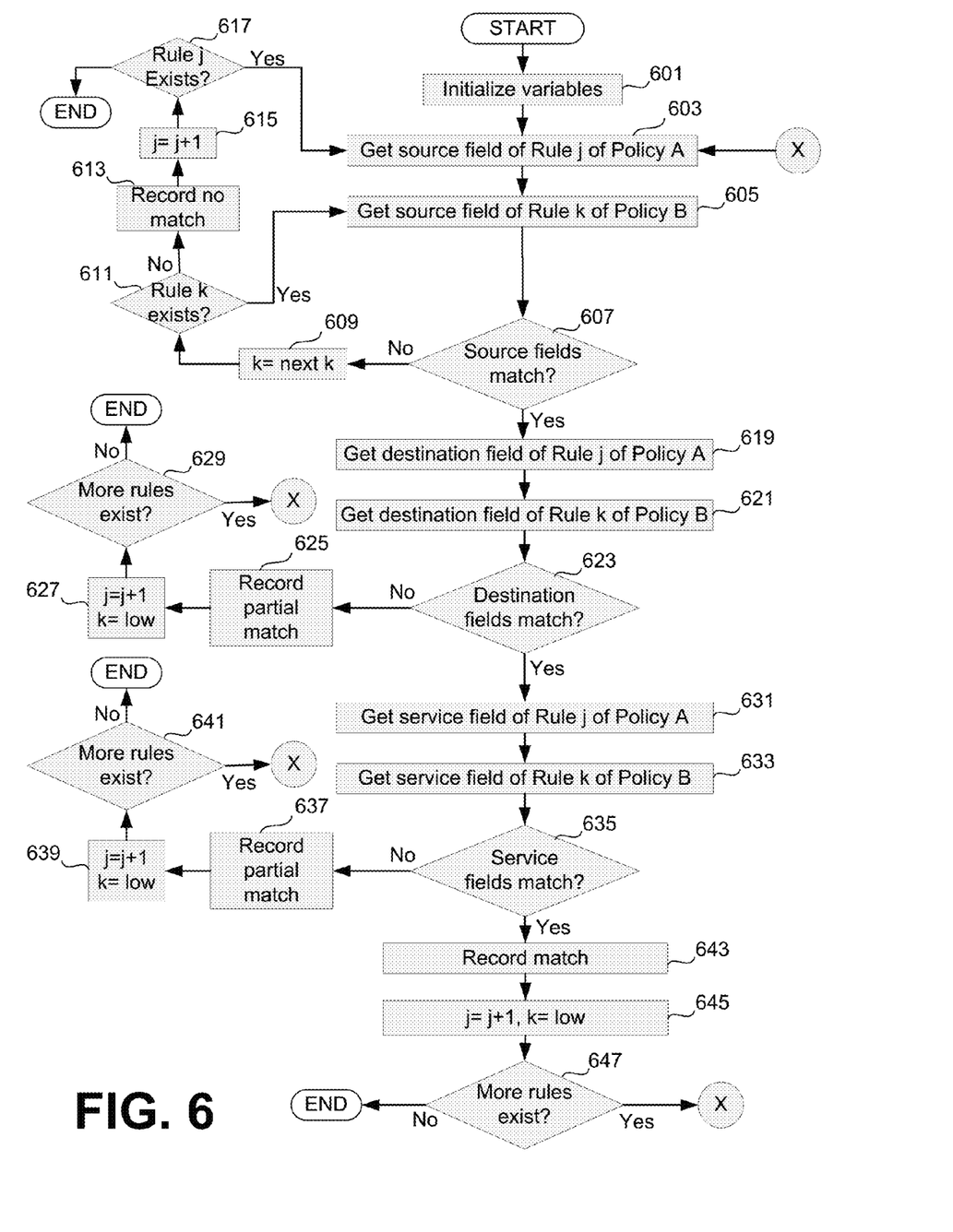
FIG. 6 is a flow diagram illustrating an example method according to one or more aspects described herein.

FIG. 6 illustrates an example algorithm for performing the comparison of step 407. The algorithm illustrated in FIG. 6 compares three fields: a source field, destination field, and service field. In other algorithms, more or fewer fields may be considered. Also, other algorithms may consider different fields.

The illustrative algorithm of FIG. 6 begins with step 601 in which variables are created and/or initialized. For example, variable j and variable k may be created and initialized in step 601. Other variables may also be created at step 601. Also, variables may be given any name and use various variable types (e.g., integer, double, string, etc.). In some embodiments, both j and k may be initialized to have a value of 1. It should be understood that the algorithm of FIG. 6 may be executed multiple times, so step 601 may act to reset the variables j and k.

In step 603, the source field of rule j of policy A may be retrieved. For example, the firewall comparison tool may obtain the source field of rule j of policy A. In the first instance of performing step 603 for each instance in which the algorithm of FIG. 6 is executed, the source field of the first rule (Rule 1) of policy A may be retrieved.

In step 605, the source field of rule k of policy B may be retrieved. For example, the firewall comparison tool may obtain the source field of rule k of policy B. In the first instance of performing step 605 for each instance in which the algorithm of FIG. 6 is executed, the source field of the first rule (Rule 1) of policy B may be retrieved.

In step 607, the source field of rule j of policy A may be compared against the source field of rule k of policy B. For example, the firewall comparison tool may compare the source field of rule j of policy A obtained at step 603 against the source field of rule k of policy B obtained at step 605. The comparison at step 607 may compare objects of each of the source fields. That is, the objects of the source field of rule j of policy A may be compared against the objects of the source field of rule k of policy B. In some embodiments, the objects may be compared to determine whether there is a match. In other words, step 607 may include determining whether the objects of the source field of rule j of policy A match the objects of the source field of rule k of policy B. Comparing objects to determine a match may include comparing object names, object types, and/or object properties (e.g., IP addresses, port ranges, etc.).

In some embodiments, a positive match may be determined if there is an exact (e.g., 100%) match between what is being compared (e.g., object properties). In other embodiments, a positive match may be determined if what is being compared (e.g., object properties) matches to some degree or extent (e.g., if similarities exceed some threshold). For example, the firewall comparison tool may determine a positive match (YES) at step 607 if 80% of the object properties of one field of rule j of policy A are the same as object properties of a corresponding field of rule k of policy B.

If no match is determined (NO) at step 607, step 609 may be performed to increase the value of variable k to a next available value of k. More specifically, step 609 may set the value of k to the rule of policy B having the next available rule number among the rules that have not been matched. It should be understood that k may be set with different values in different circumstances. For example, in a case where the first rule (rule j where j=1) of policy A and the first rule (rule k where k=1) do not have matching source fields, the value of k may be increased by one. In other words, the next available rule may be the second rule having a rule number of two (2) so k may be assigned a value of two. In another case, where some rules of policy B have already been matched with rules of policy A, k may be increased by more than one so as to skip over evaluating rules of policy B that have already been matched. By increasing the value of k, the firewall comparison tool may move to evaluating a next available (e.g., unmatched) rule of policy B. Moreover, by skipping over rules of policy B that have already been matched, the processing time used to compare policies A and B may be reduced. The firewall comparison tool may store information indicating which rules of policy B have been matched, and this information may be used to determine the next value of k set at step 609.

Step 611 may be performed to check whether there is another rule of policy B to be used for the comparison. The firewall comparison tool may determine whether a next rule of policy B exists. If a next rule of policy B exists, the algorithm may perform step 605 again with a new value for k (e.g., a value of k increased by one since the last time step 605 was performed in the instance of the algorithm). If all existing rules of policy B have been used for comparison and a match is not found with the rule j of policy A (NO at step 611), the firewall comparison tool may record that there is no match for rule j of policy A at step 613. The lack of a match may be stored/recorded in memory of, or coupled to, the computing device executing (or operating as) the firewall comparison tool.

After step 613, step 615 may be performed to increase the value of variable j by one. In other words, j may be assigned a value equal to the present value of j plus one. By increasing the value of j, the firewall comparison tool may move to a next rule of the policy A. For example, if no match was found for a first rule of policy A, the value of j may be increased from "1" to "2" so that a second rule of policy A may be used for comparison against rules of policy B. Step 617 may be performed to check whether there is another rule of policy A to be used for the comparison. In step 617, the firewall comparison tool may determine whether a next rule of policy A exists. If a next rule of policy A exists, the algorithm may perform step 603 again with a new value for j (e.g., a value of j increased by one since the last time step 603 was performed in the instance of the algorithm). If all existing rules of policy A have been used for comparison (e.g., no further rules of policy A are available for comparison), the algorithm of FIG. 6 may end.

Returning to step 607, if a positive match is found (YES at step 607), the destination field of rule j of policy A may be retrieved at step 619. For example, the firewall comparison tool may obtain the destination field of rule j of policy A. If the source fields of two rules match, the firewall comparison tool may prepare to compare the destination fields of the same two rules. Thus, an accurate comparison of the firewall policies may be achieved.

In step 621, the destination field of rule k of policy B may be retrieved. For example, the firewall comparison tool may obtain the destination field of rule k of policy B. Like step 619, step 621 may be performed to prepare for a comparison between the destination fields of two rules that had matching source fields.

In step 623, the destination field of rule j of policy A may be compared against the destination field of rule k of policy B. For example, the firewall comparison tool may compare the destination field of rule j of policy A obtained at step 619 against the destination field of rule k of policy B obtained at step 621. The comparison at step 623 may be performed in various ways as described above with respect to step 607. The comparison at step 623 may be based on the same or different factors (e.g., comparing criteria, such as object properties) as that used in step 607 of the same instance of the algorithm. Similar or different thresholds used in step 607 may be used in step 623. For example, while step 607 may require an exact match (e.g., 100% match) to determine a positive match, step 623 may utilize a 90% threshold to determine a positive match.

If a negative match is determined at step 623 (NO at step 623), step 625 may be performed to record a partial match. For example, the firewall comparison tool may record or store information indicating that the source fields of rule j of policy A and rule k of policy B match, but that the destination fields of rule j of policy A and rule k of policy B do not match. After recording a partial match, the value of j may be increased by one at step 627 so that a process for finding a match for the next rule of policy A may be performed. Also at step 627, the value of k may be set to the rule of policy B having the lowest rule number among the rules that have not been matched. For example, if rules 1, 2, 3, and 5 of policy B have been matched with rules of policy A, but rule 4 of policy B has not been matched with a rule of policy A when step 639 is performed, then k may be set to 4. A variable (e.g., "low") may be used to track which rule number is the lowest rule number among the available (e.g., unmatched) rules. Each time a rule is matched it may be removed from further consideration during the comparison.

In step 629, the comparison process may include determining whether more rules for comparison exist. That is, the comparison process may include determining whether there are more rules to be considered for comparison. In particular, the process may check whether a rule of policy A with a rule number of j and a rule of policy B with a rule number of k exist and are available (e.g., unmatched). For example, if the value of j has been increased to twenty (20) at step 627, the comparison process may determine whether rule 20 of policy A exists. If there is a rule 20 of policy A, the firewall comparison tool may determine that rule 20 does exist at step 629. In addition, the firewall comparison tool may determine whether a rule k of policy B exists and is available at step 629. If all rules of policy B have been matched, the value of k may be null or otherwise indicate that no further rules are available for comparison. Accordingly, the firewall comparison tool may determine that no more rules for policy B exist at step 629. If there are no more rules for either policy A or policy B to be evaluated in the comparison process (No at step 629), the firewall comparison tool may terminate or end the comparison process (e.g., terminate an instance of executing the algorithm of FIG. 6). On the other hand, if there are additional rules to be evaluated, the comparison process may return to step 603 (as shown through path X in FIG. 6). As such, the comparison process may continue to compare a next rule of policy A with the rules of policy B to determine whether there is a match.

Returning to step 623, if a positive match is found (YES at step 623), the service field of rule j of policy A may be retrieved at step 631. For example, the firewall comparison tool may obtain the service field of rule j of policy A. If the source and/or destination fields of two rules match, the firewall comparison tool may prepare to compare the service fields of the same two rules. Thus, an accurate comparison of the firewall policies may be achieved.

In step 633, the service field of rule k of policy B may be retrieved. For example, the firewall comparison tool may obtain the service field of rule k of policy B. Like step 631, step 633 may be performed to prepare for a comparison between the service fields of two rules that had matching source fields and/or destination fields.

Steps 635, 637, 639, and 641 may be performed in a similar manner as steps 623, 625, 627, and 629, respectively. For example, step 635 may be performed in a similar manner as step 623, but instead of comparing destination fields to determine a match, step 635 includes comparing service fields to determine a match. Because steps 635, 637, 639, and 641 are similar to those described above, further description of these steps will not be provided here.

If the service fields match (Yes at step 635), the firewall comparison tool may record or store information indicating a match between rule j of policy A and rule k of policy B at step 643. Because step 635 in the algorithm of FIG. 6 might only be performed after source fields and destinations fields are matched, the firewall comparison tool may record information indicating that the source fields, destination fields, and service fields match. In other words, a complete match (or full match or exact match) may be determined at step 643.

After step 643 is performed, the firewall comparison tool may perform steps 645 and 647. Steps 645 and 647 may be performed in a similar manner as steps 627 and 629, respectively. Because steps 645 and 647 are similar to those described above, further description of these steps will not be provided here.

It should be understood that FIG. 6 illustrates an example algorithm and that one or more of the steps of FIG. 6 may be performed in a different order, omitted, or combined. For example, in some embodiments, the algorithm may cause a computing device to evaluate the service fields and/or destination fields of two rules before evaluating the source fields of the two rules. Further, in some embodiments, the algorithm may cause a computing device to evaluate destination and/or service fields of two rules even if the source fields of the two rules do not match. For example, the algorithm may cause the computing device to compare each of the source fields, destination fields, and/or service fields of two rules before determining whether there is a match or not and moving on to compare two other rules.

Returning to FIG. 4, after executing the algorithm of FIG. 6 or another algorithm for performing the comparison at step 407, the process of FIG. 4 may continue to step 408. Step 408 may include determining one or more scores of the comparison. For example, the firewall comparison tool may determine one or more scores as a result of the comparison of firewall policies. A score may be determined for each pair of matching rules. A rule that does not have a match may have a score of zero (0). Additionally, or alternatively, an overall score may be determined for the comparison of the policies as a whole. For example, an overall score may be the mean score, median score, or some other score based on the scores for each of the rules evaluated or each of the rules for a particular one of the firewall policies compared (e.g., scores for each of the rules of policy A).

In some embodiments, information collected while performing step 407 may be used to determine the score(s) at step 408. Various algorithms may be used to determine the score(s) of the comparison. The particulars of the algorithm used to determine the score may depend on the factors used to compare the policies. For example, if the source, destination, and service fields are compared in step 407 and only the destination fields of two rules match, the score for those two rules may be 33 out of 100 (or 33%). In another example, if the source, destination, and service fields are compared in step 407 and both the source and destination fields of two rules match but the service fields do not match, the score for those two rules may be 66 out of 100 (or 66%).

Further, as described herein, comparing rules may include comparing objects (e.g., object properties) of fields of the rules. If, for example, the object properties of all fields of one rule of policy A match 75% of the object properties of another rule (e.g., a matching rule) of policy B, the score for these two rules may be 75 out of 100 (or 75%). Similarly, if, for example, the object properties of all fields of one rule of policy A match 50% of the object properties of another rule (e.g., a matching rule) of policy B, the score for these two rules may be determined to be 50 out of 100, 5 out of 10, or 50%.

In step 409, the comparison process may include outputting the results of the comparison (e.g., a report of the comparison). For example, the firewall comparison tool may output results of the comparison. In some embodiments, outputting the results may include displaying the results on a display of a computing device. For example, the results may be displayed through a web portal providing the firewall comparison tool. Additionally, or alternatively, outputting the results may include emailing the results to a designated email address. For example, a user may designate an email address to which the results should be sent at step 406, and the results may be included in an email generated and transmitted to the designated email address in step 409. Further, outputting results may include printing the results at a designated printer.

The results output at step 409 may be provided in various forms or formats. For example, the results may include the raw scores computed/calculated in step 408. Additionally, or alternatively, the results may include text describing matches as an "exact match," "high confidence" match, "medium confidence" match, "low confidence" match. Such text may be determined based on the raw scores determined at step 408. For example, the text may describe the match as a "high confidence" match if the raw score determined at step 408 is 90 or more (e.g., 90% or above). Or, for example, the text may describe the match as a "low confidence" match if the raw score determined at step 408 is between 50 and 75 (e.g., between 50% and 75%).

In some embodiments, the results output at step 409 may provide an explanation. For example, the results may identify which fields and/or objects match and/or do not match. For example, the results may specify that rule 1 of policy A and rule 3 of policy B match except for the service fields. Different levels of granularity may be provided in the explanation. For example, in some embodiments, the results may identify the particular object properties that did not match. Further, the results may be color coded to assist users in reviewing the results. For example, the firewall comparison tool may highlight text, use red text, etc. within the results to mark reasons that two rules did not result in an exact match.

It should be understood that FIG. 4 illustrates an example comparison process and that one or more of the steps of FIG. 4 may be performed in a different order, omitted, or combined. For example, in some embodiments, the collection at step 401 may be performed in response to access to the firewall comparison tool. For example, the collection at step 401 may be performed when a user accesses a web portal supporting the firewall comparison tool. Also, for example, step 406 may be omitted and default comparison criteria may be used, such that the user does not specify comparison criteria.

Figure 7:
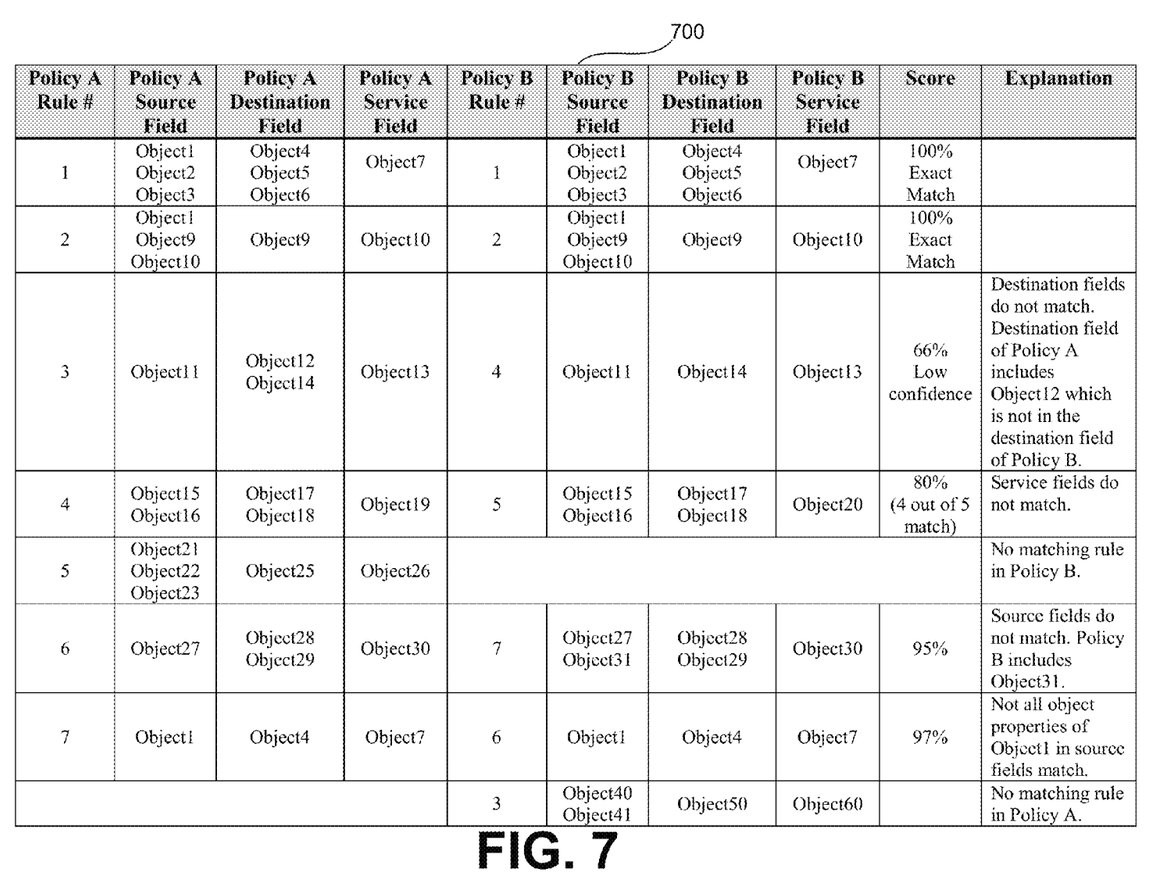
FIG. 7 illustrates an example user interface according to one or more aspects described herein.

FIG. 7 illustrates an example user interface 700 that may be provided at step 409. As shown in FIG. 7, the results may be in the form of a table. The table may arrange matching rules of policy A alongside matching rules of policy B. The table may also include the object names of objects in each of the fields considered during the comparison. For example, the illustrative user interface 700 includes object names of the source fields, destination fields, and service fields of each rule in a case where all three fields were considered during the comparison.

FIG. 7 further illustrates that a score may be provided for each of the matching rules. Also, FIG. 7 illustrates that the table may include a column ("Explanation" column) providing reasons certain matching pairs of rules did not result in an exact match. For example, a cell in the "Explanation" column may indicate the names of objects that were not matched. Moreover, a cell in the "Explanation" column may indicate which field in which policy the unmatched objects belong to.

Additionally, as shown in FIG. 7, some rules of one policy might not have a matching rule of another policy. For example, rule 5 of policy A does not have a matching rule in policy B and rule 3 of policy B does not have a matching rule in policy A.

It should be understood that FIG. 7 illustrates an example user interface and that various other user interfaces may be arranged to provide similar information. For example, the firewall comparison tool may provide a smaller table that combines the explanation column with the score column. The table may be made even smaller to include only a column with the matching rule numbers and a column with the score. Also, the table might not include the object names in the columns, and instead, may include, e.g., a checkmark in fields if the fields match and other indicia if the fields do not match.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions stored on a computer-readable medium, such as a non-transitory computer readable medium. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Further, one or more aspects described with respect to one figure or arrangement may be used in conjunction with other aspects associated with another figure or portion of the description.

What is claimed is:

1. A system, comprising:
a first gateway configured to implement a first firewall having a first policy;
a second gateway configured to implement a second firewall having a second policy;
a computing device comprising a network interface and configured to:
generate a listing of firewall policies of the system to compare;
provide, through a web portal, a first selectable object configured to allow a user to select the first policy from the listing of firewall policies and a second selectable object configured to allow the user to select the second policy from the listing of firewall policies;

receive, through the web portal, selections of the first policy and the second policy;

receive, from the first gateway, first configuration data of the first firewall;

receive, from the second gateway, second configuration data of the second firewall;

compare the first policy with the second policy based on the first configuration data and the second configuration data by at least:

comparing a source field, a destination field, and a service field of a first rule of the first policy respectively with a source field, a destination field, and a service field of a first rule of the second policy;

determining a percentage of object properties associated with the service field of the first rule of the first policy that match object properties associated with the service field of the first rule of the second policy; and in response to determining that the percentage is greater than a predetermined threshold, determining that the first rule of the first policy matches the first rule of the second policy;

determine a score indicating a degree to which the first policy matches the second policy, wherein the score is at least based on a first score indicating a degree to which the source field, the destination field, and the service field of the first rule of the first policy respectively match the source field, the destination field, and the service field of the first rule of the second policy and based on a second score indicating a degree to which a source field, a destination field, and a service field of a second rule of the first policy respectively match a source field, a destination field, and a service field of a second rule of the second policy; and a display configured to display the score.

2. The system of claim 1, wherein the computing device is further configured to:

parse the first configuration data and the second configuration data, the second configuration data having a format different from a format of the first configuration data;

generate a first data structure, comprising the first configuration data; and generate a second data structure, comprising the second configuration data, the first data structure and the second data structure having a common format.

3. The system of claim 1, wherein the first firewall protects a first subsystem, comprising a first data center for a first geographical location, and the second firewall protects a second subsystem, comprising a second data center for a second geographical location.

4. The system of claim 1, wherein the first score is at least based on a degree to which object properties of the first rule of the first policy match object properties of the first rule of the second policy.

5. The system of claim 4, wherein the score is an average of a plurality of rule scores comprising the first score and the second score.

6. The system of claim 1, wherein the computing device is configured to determine whether an object property of any objects of a particular field of the first rule of the first policy matches an object property of any objects of a corresponding field of the first rule of the second policy.

7. The system of claim 1, wherein the computing device is further configured to output a report identifying a reason that the first policy and the second policy are not an exact match.

8. The system of claim 1, wherein the computing device is further configured to provide, through the web portal, results of the comparison of the first policy with the second policy.

9. The system of claim 1, wherein the determining that the first rule of the first policy matches the first rule of the second policy is responsive to:

determining a second percentage of object properties associated with the source field of the first rule of the first policy that match object properties associated with the source field of the first rule of the second policy; and determining that the second percentage is greater than a second predetermined threshold.

10. The system of claim 9, wherein the determining that the first rule of the first policy matches the first rule of the second policy is responsive to:

determining a third percentage of object properties associated with the destination field of the first rule of the first policy that match object properties associated with the destination field of the first rule of the second policy; and determining that the third percentage is greater than a third predetermined threshold.

11. A non-transitory computer-readable storage medium storing computer-executable instructions that, when executed by a computing device, cause the computing device to:

generate a listing of firewall policies to compare;

provide, through a web portal, a first selectable object configured to allow a user to select a first policy from the listing of firewall policies and a second selectable object configured to allow the user to select a second policy from the listing of firewall policies;

receive, through the web portal, selections of the first policy and the second policy;

receive, from a first gateway, first configuration data of a first firewall having the first policy;

receive, from a second gateway, second configuration data of a second firewall having the second policy;

compare the first policy with the second policy based on the first configuration data and the second configuration data by at least:

comparing a source field, a destination field, and a service field of a first rule of the first policy respectively with a source field, a destination field, and a service field of a first rule of the second policy;

determining a percentage of object properties associated with the service field of the first rule of the first policy that match object properties associated with the service field of the first rule of the second policy; and in response to determining that the percentage is greater than a predetermined threshold, determining that the first rule of the first policy matches the first rule of the second policy;

determine a score indicating a degree to which the first policy matches the second policy, wherein the score is at least based on a first score indicating a degree to which the source field, the destination field, and the service field of the first rule of the first policy respectively match the source field, the destination field, and the service field of the first rule of the second policy and based on a second score indicating a degree to which a source field, a destination field, and a service field of a second rule of the first policy respectively match a source field, a destination field, and a service field of a second rule of the second policy; and output the score for display.

12. The non-transitory computer-readable storage medium of claim 11, wherein the second configuration data has a different format from a format of the first configuration data, and wherein the computer-executable instructions, when executed, further cause the computing device to:

parse the first configuration data and the second configuration data;

generate a first data structure, comprising the first configuration data; and generate a second data structure, comprising the second configuration data, the first data structure and the second data structure having a common format.

13. The non-transitory computer-readable storage medium of claim 11, wherein the computer-executable instructions, when executed, further cause the computing device to:

determine the first score based on a degree to which object properties of the first rule of the first policy match object properties of the first rule of the second policy.

14. The non-transitory computer-readable storage medium of claim 11, wherein the computer-executable instructions, when executed, further cause the computing device to:

determine the first score based on a number of object properties of the first rule of the first policy that match object properties of the first rule of the second policy.

15. The non-transitory computer-readable storage medium of claim 11, wherein the computer-executable instructions, when executed, further cause the computing device to:

determine an average of a plurality of rule scores, comprising the first score and the second score, to determine the score.

16. The non-transitory computer-readable storage medium of claim 11, wherein the determining that the first rule of the first policy matches the first rule of the second policy is responsive to:

determining a second percentage of object properties associated with the source field of the first rule of the first policy that match object properties associated with the source field of the first rule of the second policy; and determining that the second percentage is greater than a second predetermined threshold.

17. A method, comprising:

generating a listing of firewall policies to compare;

providing, through a web portal, a first selectable object configured to allow a user to select a first policy from the listing of firewall policies and a second selectable object configured to allow the user to select a second policy from the listing of firewall policies;

receiving, through the web portal, selections of the first policy and the second policy;

receiving, from a first gateway by a computing device, first configuration data of a first firewall having the first policy;

receiving, from a second gateway by the computing device, second configuration data of a second firewall having the second policy; and comparing, by the computing device, the first policy with the second policy based on the first configuration data and the second configuration data, wherein the comparing comprises:

comparing a source field, a destination field, and a service field of a first rule of the first policy respectively with a source field, a destination field, and a service field of a first rule of the second policy;

determining a percentage of object properties associated with the service field of the first rule of the first policy that match object properties associated with the service field of the first rule of the second policy; and in response to determining that the percentage is greater than a predetermined threshold, determining that the first rule of the first policy matches the first rule of the second policy;

determining a score indicating a degree to which the first policy matches the second policy, wherein the score is at least based on a first score indicating a degree to which the source field, the destination field, and the service field of the first rule of the first policy respectively match the source field, the destination field, and the service field of the first rule of the second policy and based on a second score indicating a degree to which a source field, a destination field, and a service field of a second rule of the first policy respectively match a source field, a destination field, and a service field of a second rule of the second policy; and outputting, by the computing device via an output device, the score.

18. The method of claim 17, further comprising:

parsing the first configuration data and the second configuration data;

generating a first data structure, comprising the first configuration data;

generating a second data structure, comprising the second configuration data, the first data structure and the second data structure having a common format; and outputting, via the web portal, the score and an explanation identifying objects of the first rule of the first policy that do not match objects of the first rule of the second policy, wherein the first firewall is implemented on a different platform from that of the second firewall.

19. The method of claim 17, wherein the determining the score comprises:

determining an average of a plurality of rule scores, comprising the first score and the second score, to determine the score.

20. The method of claim 17, wherein the determining that the first rule of the first policy matches the first rule of the second policy is responsive to:

determining a second percentage of object properties associated with the source field of the first rule of the first policy that match object properties associated with the source field of the first rule of the second policy; and determining that the second percentage is greater than a second predetermined threshold.

* * * * *